2,806,839

PREPARATION OF POLYIMINES FROM 2-OXAZOLIDONE

Milton Crowther, Valley Falls, and William R. Nummy, Warren, R. I., assignors to Arnold, Hoffman & Co., Incorporated, Providence, R. I., a corporation of Rhode Island No Drawing. Application February 24, 1953, Serial No. 338,557

3 Claims. (Cl. 260—77.5)

The present invention relates to polyethyleneimines and has for its principal object the provision of an economical and convenient process for producing such products.

Polyethyleneimines are normally prepared by procedures involving the use of ethyleneimine which is highly toxic and explosive. Accordingly, another object of the invention is to provide novel procedures for producing polyethyleneiminies which make it unnecessary to use ethyleneimine. Other objects will appear hereinafter.

The foregoing objects are accomplished, according to the present invention, by heating a heterocyclic compound containing a keto group in the ring with an oxygen and a nitrogen atom both of which are alpha to the keto group, i. e., cyclic urethanes and specifically, 2-oxazolidone or N-substituted 2-oxazolidone at atmospheric or reduced pressures to drive off $CO_2$ and continuing the heating until the evolution of $CO_2$ gas ceases. Thereafter, any small amounts of volatile byproducts which may still be present in the reaction mixture are distilled out at reduced pressure. The product remaining behind as a residue has been found to be essentially a polyimine.

The invention as described above is further illustrated but not limited by the following example:

Example

Into a 200 ml. flask equipped with a thermometer and an air-cooled reflux condenser were placed 87 g. (1 mol) of 2-oxazolidone prepared by the method outlined in U. S. Patent No. 2,399,118.

Heating was started and at 80° C. and 24 mm. $CO_2$ began to be evolved. Heating was continued at 24 mm. up to 180° C. for 15 hours during which time $CO_2$ continued to be evolved. Residue at this point at room temperature was a viscous pale yellow liquid. Weight of residue 54.2 g. N=21.70%. A sample of 4 g. was removed.

Balance of residue was again heated and 3.25 g. of material were removed by distillation. Distillate boiled at 31–82° C. at 2 mm. Residue at this point was an extremely viscous, clear, pale yellow liquid. N=23.3%. A sample of 6.7 g. was removed.

Balance of residue was again heated and 14.5 g. of material boiling at 100–167° C. at 3 mm. was removed by distillation. The residue weighing 20 g. was a clear, light-yellow, brittle residue at room temperature. N=23.7%.

It will be appreciated that various modifications of the invention as above described may be made without deviating in any way from the invention as defined in the claims.

We claim:

1. A non-catalytic process for producing a polyethyleneimine which comprises heating 2-oxazolidone as the sole reactant to drive off $CO_2$ and continuing said heating until evolution of $CO_2$ gas ceases.

2. A process as claimed in claim 1 wherein the heating is carried out at atmospheric pressure.

3. A process as claimed in claim 1 wherein the heating is carried out at reduced pressure.

References Cited in the file of this patent

UNITED STATES PATENTS 2,617,825    Wood _____ Nov. 11, 1952

FOREIGN PATENTS 220,852    Germany _____ Apr. 8, 1910
906,181    France _____ May 7, 1945

OTHER REFERENCES

Schotte et al.: Hoppe Seyler's Zeits f. Physiol. Chem., 1928, vol. 174, pp. 124 and 144.